United States Patent [19]

Nakamura et al.

[11] Patent Number: 4,733,308
[45] Date of Patent: Mar. 22, 1988

[54] CONTROL METHOD OF VERTICAL SCAN SPEED

[75] Inventors: Koozoo Nakamura, Hitachi-oota; Nagaharu Hamada, Hitachi; Masaharu Tadauchi, Mito; Yasuyuki Kozima, Hitachi; Kunihiro Sakata, Kanagawa, all of Japan

[73] Assignee: Hitachi, Ltd., Tokyo, Japan

[21] Appl. No.: 894,826

[22] Filed: Aug. 8, 1986

[30] Foreign Application Priority Data

Aug. 14, 1985 [JP] Japan ................ 60-177543

[51] Int. Cl.$^4$ ................................ H04M 1/17
[52] U.S. Cl. ................................ 358/288; 358/260
[58] Field of Search ............... 358/288, 260, 280, 293

[56] References Cited

U.S. PATENT DOCUMENTS

4,629,369 12/1986 Kurata et al. ................ 358/286

Primary Examiner—Edward L. Coles, Sr.
Attorney, Agent, or Firm—Antonelli, Terry & Wands

[57] ABSTRACT

When a document and a recording medium are moved in a vertical scanning direction to read the document and record signals on the recording medium, the read signals are stored in a line buffer memory. The present invention changes over hysteretically a high speed vertical scan mode and a low speed vertical scan mode in accordance with the number of the buffered code bits in the line buffer memory to read the document and record the signal on the recording medium. Thus, the present invention reduces the number of stops of vertical scan.

6 Claims, 19 Drawing Figures

CONTROL METHOD OF VERTICAL SCAN SPEED

BACKGROUND OF THE INVENTION

1. Field of the Invention

This invention relates generally to facsimiles or the like using a redundancy reduction encoding system and having vertical scan means, and more particularly to a vertical scan control method with a reduced number of stops of vertical scan.

2. Description of the Prior Art

As disclosed, for example, in Japanese Patent Laid-Open No. 17568/1981 entitled "Vertical Scan Method of Facsimile", laid-open on Feb. 19, 1981, one example of prior art technique divides in advance a vertical scan speed into N stages, reference values $M_1$ and $M_2$ are set in advance for a code buffer, acceleration, uniform speed and deceleration are selected in accordance with the number of the buffered code bits, and the vertical scan speed is changed one stage by one in the acceleration and deceleration ranges.

Accordingly, it is always necessary to manage the present vertical scan speed and the number of the buffered code bits.

When the number of the buffered code bits is near the reference values, it is necessary to frequently switch modes between acceleration and uniform speed, between uniform speed and deceleration or between acceleration and deceleration, and complicated vertical scan speed control has been necessary.

In a thermo-sensitive recording system, for example, which divides a recording head into a plurality of blocks and applies a current only to the blocks where black pixels exist, no consideration has been paid to the change of a power feed time for recording in the unit of scan lines in accordance with the content of a video signal to be recorded.

SUMMARY OF THE INVENTION

It is a primary object of the present invention to provide a control method of a vertical scan speed in a facsimile or the like in accordance with which the number of stop of vertical scan for reading or recording can be reduced at intermediate portions of a page.

In a facsimile employing an encoding system for reducing redundancy contained in video signals such as an MH encoding system as an international standard encoding system of a facsimile, the first characterizing feature of the present invention lies in that a code buffer memory is disposed to store codes, a high speed mode (high speed vertical scan mode), a low speed mode (low speed vertical scan mode) and a reference value of the code buffer memory are in advance set, the number of the buffered code bits and the reference value are compared with each other, and the scan mode is switched in accordance with the number of the buffered code bits in order to prevent overflow of the line buffer memory and to reduce the number of stop of the vertical scan at intermediate portions of a page.

It is another object of the present invention to eliminate scan variance by gradually increasing or decreasing the vertical scan speed when the vertical scan modes are switched.

It is still another object of the present invention to eliminate frequent repetition of acceleration and deceleration due to the frequent changes of the vertical scan modes when the number of the buffered code bits is in the proximity of the reference value, by setting at least two reference values for the code buffer memory in order to make hysteresis control in such a manner that the reference value for switching from a low speed vertical scan mode to a high speed vertical scan mode is different from the reference value for switching from the high speed vertical scan mode to the low speed vertical scan mode.

In an apparatus which includes recording means for recording video signals on a recording medium portion in a recording unit and differentiating printing speeds in accordance with the content of the video signals; and vertical scan means for moving relatively the recording medium portion in each recording unit in a vertical scan direction and having the acceleration or deceleration quantity of the vertical scan speed thereof set in advance, the second characterizing feature of the present invention lies in the use, as the highest speed vertical scan mode, a vertical scan mode, wherein when a vertical scan speed in an (i+1)th recording unit, which is the sum of the acceleration quantity described above and a practical vertical scan speed of an arbitrary ith recording unit, is assumed to be an imaginary vertical scan speed in the (i+1)th recording unit and the vertical scan speeds of the (i+2)th unit and preceding units therefrom are sequentially decelerated by the deceleration quantity described above, the imaginary vertical scan speed is used as the practical scan speed of the (i+1)th unit if there does not exist any recording unit having a vertical scan speed higher than a printing speed; when the practical scanning speed in the ith recording unit is used as the imaginary vertical scan speed in the (i+1)th recording unit and the vertical scan speeds of the (i+2)th recording unit and preceding units therefrom are sequentially decelerated by the deceleration quantity described above, the practical vertical speed in the ith recording unit is used as the vertical scan speed in the (i+1)th recording unit if there does not exist any recording unit having a vertical scan speed higher than the printing speed in cases other than the case described above; and the vertical scan speed obtained by reducing the deceleration quantity described above from the practical scan speed in the ith recording unit is used as the vertical scan speed in the (i+1)th recording unit, in cases other than the two cases described above.

DESCRIPTION OF THE PREFERRED EMBODIMENTS

Figure 1:
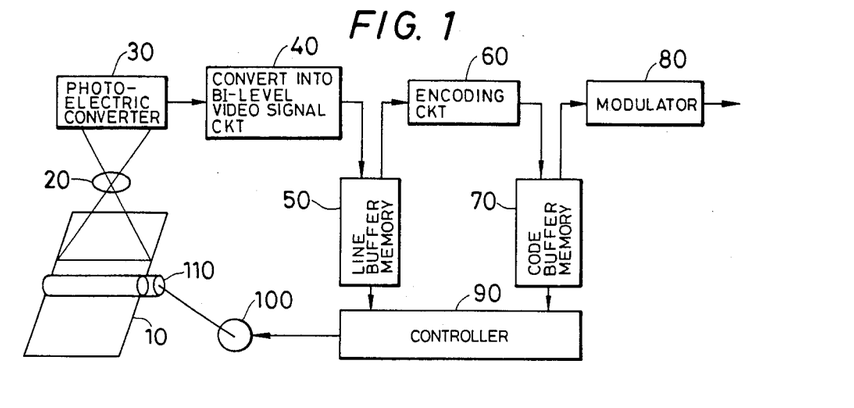
FIG. 1 is a data flowchart when the present invention is applied to a high speed facsimile transmitter.

In FIG. 1, reference numeral 10 represents a document; 20 is a lens; 30 is a photo-electrical converter for converting optical signals of one scan line in a main scan direction into electric signals; 40 is a bi-level video signal conversion circuit for converting an analog electric signal into white and black bi-level electric signals (hereinafter called the "video signals"); 50 is a line buffer memory for storing the video signal; 60 is an encoding circuit for reducing the redundancy contained in the video signal and converting it into a code; 70 is a code buffer memory for storing the code; 80 is a modulator for modulating the code and converting it into a signal that can be transmitted through a telephone network; 100 is a motor for moving the document 10 and accomplishing vertical scan; and 110 is a rubber roller for supporting the document 10 and transmitting the rotation motion of the pulse motor 100 to the document 10.

Next, the operation of the facsimile transmitter will be explained.

The picture information of the document corresponding to one scan line in the main scan direction is received as an optical signal by the photoelectric converter 30 through the lens 20 and is converted to an analog electric signal by the converter 30. The analog electric signal is converted to a bi-level video signal representing black and white by the bi-level video signal circuit 40. The picture signal is first stored in the line buffer memory 50 and is then encoded for redundancy reduction by the encoding circuit 60 and converted to a code. High speed facsimiles of the international standard employ a modified Hoffman code (MH code) as the redundancy reduction code, and the code described above corresponds to this MH code. The code is first stored in the code buffer memory 70, is then modulated by the modulator 80 and is thereafter outputted to the telephone circuit. A controller 90 receives the stored video signal quantity of the line buffer memory 50 and the number of buffered code bits of the code buffer memory 70, switches the vertical scan modes in accordance with the number of the buffered code bits when a sufficiently empty region exists in the line buffer memory 50 (always in this state so long as the empty region exists in the code buffer memory 70 if the encoder has a sufficiently high speed), and controls the vertical scan speed determined by each vertical scan mode by controlling the motor 100.

In other words, if the number of the buffered code bits is smaller than predetermined reference values (the values at which the code buffer memory 70 does not easily overflow or underflow) of the code buffer memory 70, the controller 90 controls the motor 100 to operate in the high speed vertical mode and if the number of the buffered code bits is greater than the reference values, it controls the motor 100 to operate in the low speed vertical mode.

In the case of a Group 3 facsimile of the international standard, 50 lps (line per second) corresponding to 20 ms/line as the smallest transmission time per scanning line is used as the high speed vertical scan mode, the region of the standard document having a large information quantity is encoded by the MH code, 5 lps corresponding to 200 ms/line (with the theoretical maximum transmission time being 1 s/line) which is the transmission time near the average transmission time when transmission is made at a transmission speed of 4,800 bps (bit per second) is set to the low speed vertical scan mode and the vertical scan modes are switched in accordance with these reference values. In this manner, it becomes possible to reduce the number of times of stopping of vertical scan at the intermediate portions of a page when the code buffer memory 70 becomes full.

When vertical scan is started from stop, variance occurs in the movement of the document due to the delay of rise of the operation of motor 100 and the delay of the transmission system of the rubber roller 110, and accurate reading of the document cannot be made.

Accordingly, this embodiment provides the effect that non-uniform reading can be reduced because the number of times of stopping of vertical scan at the intermediate portions of a page can be reduced.

Figure 2:
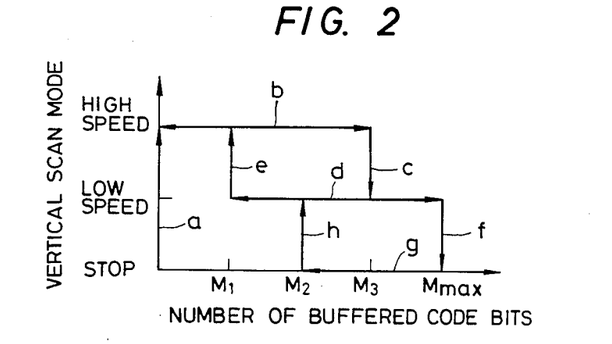
FIG. 2 is a diagram showing the shift of the vertical scan modes of the facsimile transmitter in accordance with the present invention.

Referring to FIG. 2, the abscissa represents the number of the buffered code bits and the ordinate indicates the vertical scan mode. Symbols $M_1$, $M_2$, $M_3$ and $M_{max}$ on the absicca represent the reference values, and they have the relation $M_1 < M_2 < M_3 < M_{max}$. The vertical scan modes consist of three kinds of modes, that is, stop, low speed and high speed.

Next, the flow of the mode transition will be explained.

The state of the facsimile transmitter is positioned at the origin of FIG. 2 at the start of a page. When transmission is started, the mode shifts to the position of the state line b along the state line a, thereby establishing the high speed vertical scan mode. Under this state, if the encoding speed is greater than the code transmission speed (such a condition occurs when a region having a large information quantity is scanned), the number of the buffered code bits increases along the state line b and reaches the reference value $M_3$. When the number of the buffered code bits reaches the reference value $M_3$, the mode shifts to the low speed vertical scan mode of the state line d along the state line c. When the scanning region enters the region having a small information quantity during the low speed vertical scan mode, the number of the buffered code bits drops along the state line d. When the number of the buffered code bits is below $M_1$ in the low speed vertical mode, the mode shifts to the high speed vertical scan mode along the state line e. If the encoding speed is greater than the code transmission speed because a region having an extremely large information quantity is scanned in the low speed vertical scan mode, the number of the buffered code bits increases along the state line d. The mode shifts to the stop mode along the state line f when the number of the buffered code bits reaches $M_{max}$. In the stop mode, the number of the buffered code bits decreases along the state line g and when it is below the reference value $M_2$, the mode shifts to the low speed vertical scan mode along the state line h.

In accordance with this embodiment, the number of times of shift of the vertical scan modes can be reduced because hysteresis is provided to the shift of the vertical scan modes. Therefore, variance of the moving quantity of the document 10 due to the acceleration or deceleration of the vertical scan speed can be reduced and scan can be made accurately because the number of times of acceleration and deceleration of the vertical scan speed necessary for the shift of the vertical scan mode can be reduced.

When a pulse motor that has been used widely in many facsimiles is used as the motor 100 for executing vertical scan, feed variance will occur due to disturbance of step response if drastic acceleration or deceleration is made. The pulse motors in general have the characteristics such that when the driving frequency is gradually increased, they can be operated synchronously at a frequency higher than the frequency to which they can respond rapidly from the stationary state.

Figure 3:
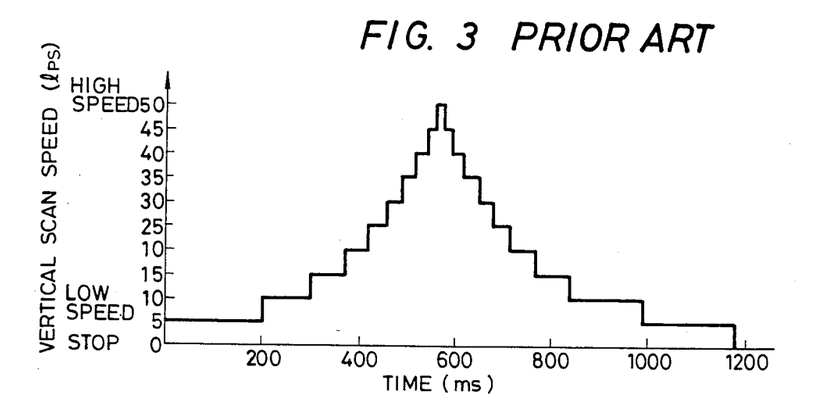
FIG. 3 is a diagram showing the acceleration and deceleration patterns of the vertical scan speed in a conventional facsimile transmitter.

Referring to FIG. 3, the ordinate represent the vertical scan speed and 5 lps corresponds to the low speed vertical scan while 50 lps corresponds to the high speed vertical scan mode. The abscissa represents time. Acceleration and deceleration are effected gradually over nine stages in order to shift the modes from the low speed vertical scan control mode to the high speed vertical scan mode and vice versa.

According to this embodiment, variance of the moving quantity of the document resulting from the acceleration or deceleration of the vertical scan speed can be reduced and accurate scan can be made.

Figure 4A:
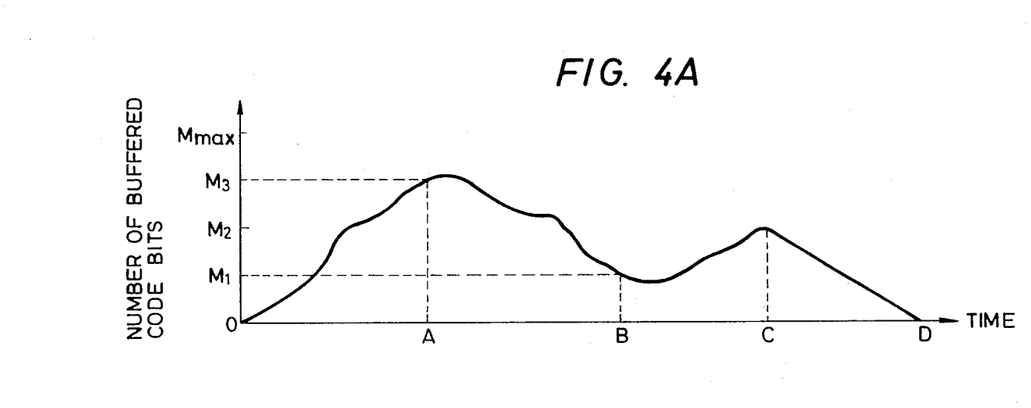
FIGS. 4A & B are operation time charts of the facsimile transmitter in the present invention.
Figure 4B:
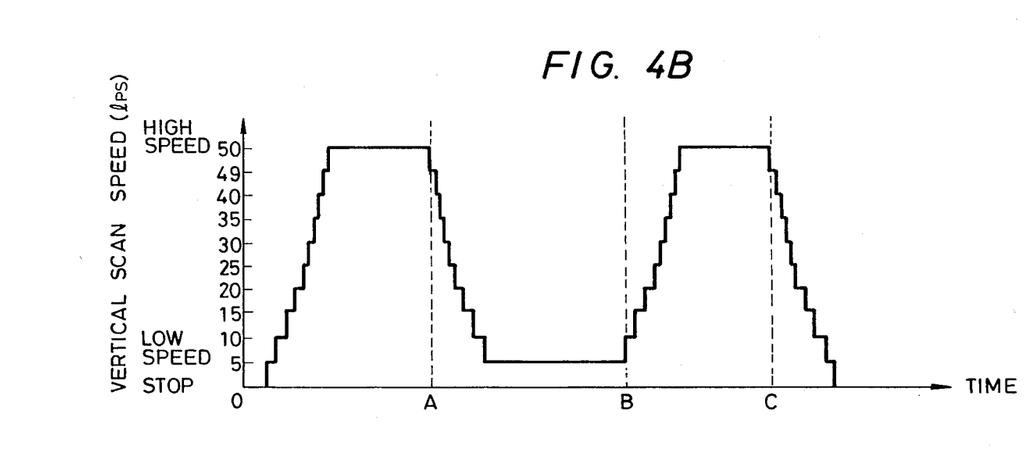

FIG. 4 shows a timing chart when a certain document is sent by use of the vertical scan control method described above in detail. The ordinate of FIG. 4A represents the number of buffered code bits and that of FIG. 4B represents the vertical scan speed. The abscissa in each of FIGS. 4A and 4B represents time. Since the number of the buffered code bits is small at the start of transmission, the vertical scan speed is gradually accelerated and scan is effected in the high speed scan mode of 50 lps. Since the scan is at this high speed, the code generation speed (which varies depending upon the information quantity of the video signal) is generally greater than the code transmission speed (which is constant at 4,800 bps, for example), and the number of the buffered code bits increases gradually. Since the number of the buffered code bits exceeds the reference value $M_3$ at the point of time A, the vertical scan speed is gradually decelerated and the mode shifts to the low speed vertical scan mode. When the vertical scan speed drops to a low speed, the encoding speed decreases so that the number of the buffered code bits decreases gradually. Since the number of the buffered code bits is smaller than the reference value $M_1$ at the point of time B, the vertical scan speed is again accelerated and the mode shifts to the high speed vertical scan mode. Since scan of one page is completed before the point of time C, the vertical scan speed is gradually decelerated and then stopped. After the time C, the number of the buffered code bits decreases in proportion to the code transmission speed and transmission is completed at the time D.

Figures 5, 6:
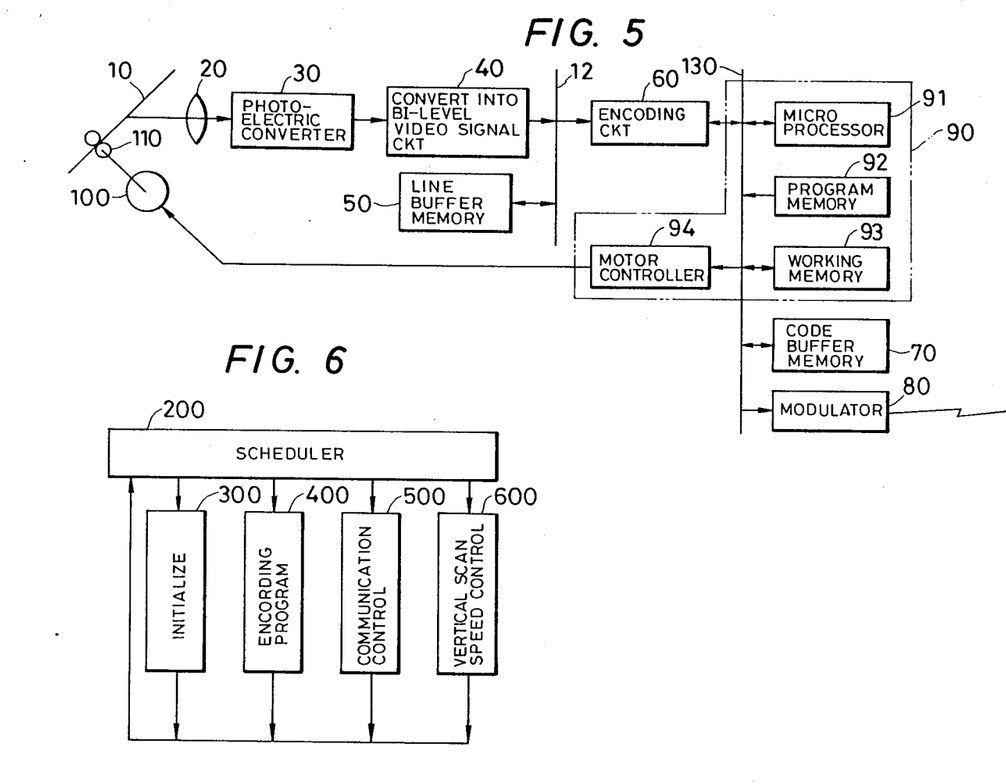
FIG. 5 is a block circuit diagram of the facsimile transmitter in the present invention.
FIG. 6 is a block diagram showing a program construction of the facsimile transmitter in the present invention.

FIG. 5 is a block diagram showing the circuit construction of one embodiment when the present invention is applied to a facsimile transmitter. The circuit portions represented by reference numerals 10 to 110 correspond to those represented by reference numerals 10 to 110 in FIG. 1. The controller 90 consists of constituents 91 to 94. Reference numeral 91 represents a microcomputer, and 92 is a program memory for storing the program of the microcomputer 91. An ROM (Read Only Memory) is generally used for the program memory 92. ROM 92 stores therein the program corresponding to the operation flow shown in FIGS. 6 and 7. Reference numeral 93 represents a working memory for working of the microcomputer 91 and an RAM (Random Access Memory) is generally used for the working memory 93. This memory 93 stores information necessary for the operation of the microcomputer 71 such as a present vertical scan speed.

Reference numeral 94 represents a motor controller which controls the motor 100 and outputs a driving pulse to the motor 100 in accordance with the instruction from the microcomputer 91. A CCD (Charge Coupled Device) is used as the photoelectric converter 30, while an image processor is used as the bi-level video signal circuit 40. RAMs, for example, are used as the line buffer memory 50 and the code buffer memory 70, while a compression/expansion processor is used as the encoding circuit 60.

Next, the operation will be described briefly.

The photoelectric converter 30 converts the optical picture information of one scan line obtained by scanning the document 10 in the main scan direction in accordance with the instruction from the microcomputer 91 into the analog electric signal. Upon receiving the analog electric signal, the bi-level video signal circuit 30 corrects distortion and converts the analog electric signal into a black and white binary video signal. The video signal is stored in the line buffer memory 50 through a video signal bus 120. The encoding circuit 60 reads out the video signals stored in the line buffer memory 50 in accordance with the instruction from the microcomputer 91, effects redundancy reduction encoding and outputs the codes to a microcomputer bus 130. The microcomputer 91 lets the code buffer memory 70 store the codes, and outputs the codes stored in the code buffer memory 70 to the modulator 80 in accordance with the demand from the modulator 80. The modulator 80 modulates the code and outputs it to the telephone network at a transmission speed of 4,800 pbs, for example.

The microcomputer decides the next vertical scan speed in accordance with the stored quantity of the line buffer memory 50 and the code buffer memory 70 by employing the vertical scan speed control method of the present invention which is stored in the program 92, and sets the vertical scan speed to the motor control circuit 94. The motor control circuit 94 drives the motor 100 in accordance with the instruction from the microcomputer 91 and accomplishes the vertical scan at the vertical scan speed described above.

FIG. 6 shows the construction of the program stored in ROM 92, which is executed by the microcomputer 91. Reference numeral 200 represents a scheduler, which starts each task. Reference numeral 300 represents a task which initializes the system and inititalizes the working memory 93, for example. Reference numberal 400 represents a encoding task, which sends encoding instruction to the encoding circuit 60 and transfers the code to the code buffer memory 70. Reference numeral 500 is a communication control task which controls the communication with the receiver and outputs the code to the modulator 80. Reference numeral 600 represents a task which executes the vertical scan control of the present invention, which will be explained in further detail with reference to FIG. 7.

Figure 7:
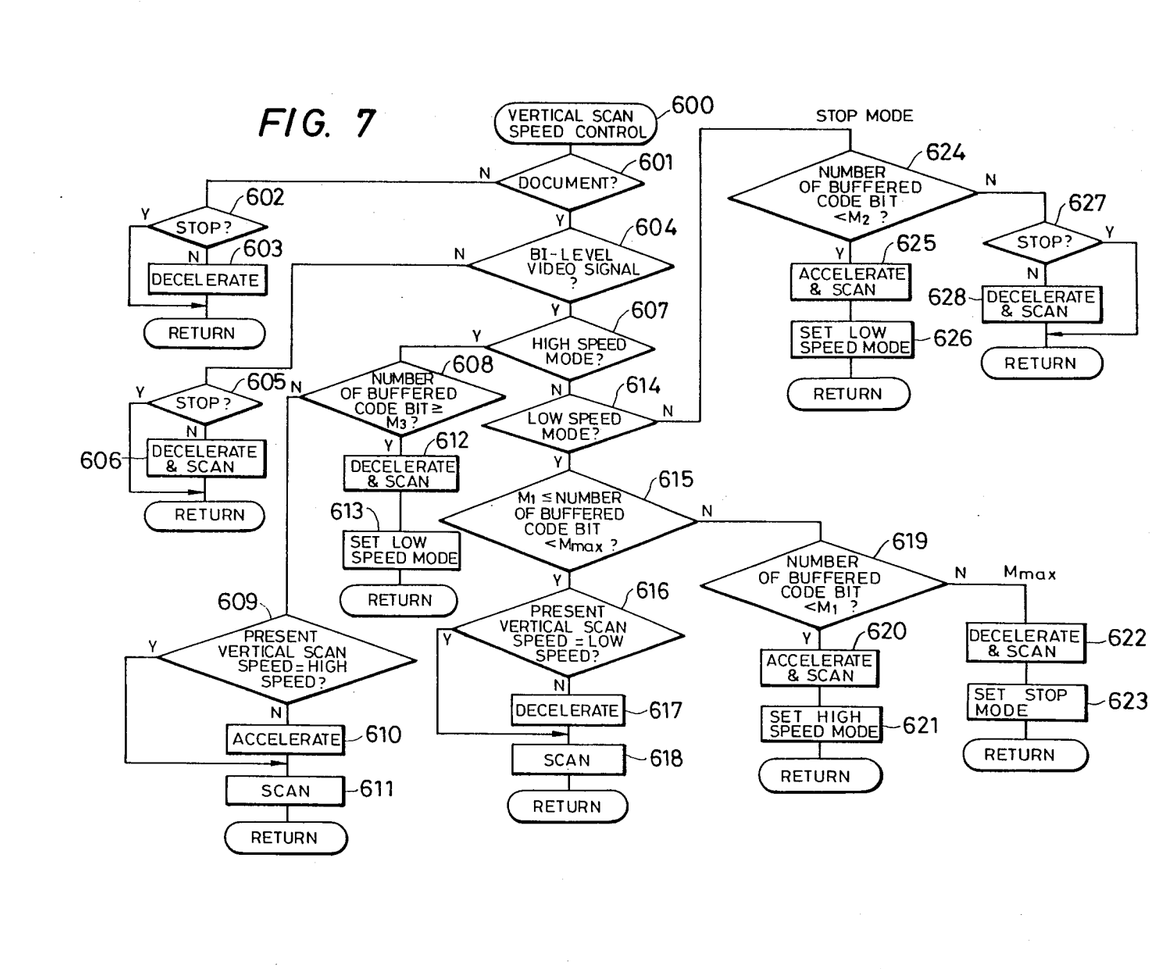
FIG. 7 is a flowchart of a vertical scan speed control program of the facsimile transmitter in the present invention.

FIG. 7 is a detailed flowchart of the vertical scan speed control task 600. This task 600 is started by the scheduler 200. The start timing is the end of vertical scan, for example. At step 601, whether or not the document to be processed exists is judged. If it does not, the flow shifts to the step 602, and if it does, the flow shifts to the step 604. At the step 602, whether or not vertical scan stops is judged. If it does, the flows returns to the scheduler 200 and if it does not, the vertical scan speed is decelerated by one stage at the step 603. At the step 604, the video signal is stored in the line buffer memory 50 while decelerating the vertical scan speed one stage by one and whether or not a sufficiently empty region to prevent the overflow of the line buffer memory 50 exists is judged. In FIG. 3, for example, when the vertical scan speed is 50 lps, deceleration must be made ten times before the stop; hence, whether or not the empty region capable of storing the video signals of at least ten scanning lines exists in the line buffer memory 50 is judged. If the empty region does not exist, the flow shifts to the step 605.

At the step 605, whether or not the scan is at halt is judged and if it is at halt, the flow returns and if it is not, the flow shifts to the stage 606. At the step 606, the vertical scan is effected by decelerating the vertical scan speed by one stage, main scan is then effected by driving the photo-electric converter 30, the video signals are stored in the line buffer memory 50 and thereafter the flow returns to the start. At the step 607, whether or not the present stage is in the high speed vertical scan mode is judged, and if it is, the flow shifts to the step 608 and if not, the flow shifts to the stage 614.

The start of the page is set to the high speed vertical scan mode by the initialize task 300. At the step 608, whether or not the number of the buffered code bits exceeds the reference value $M_3$ is judged, and if it does not, the flow shifts to the step 609 and if it does, the flow shifts to the step 612. At the step 609, whether or not the present vertical scan speed is equal to the constant speed of the high speed vertical scan mode, that is, 50 lps of FIG. 3 is judged, and if it is, the flow shifts to the step 611 and if it is not, the process shifts to the step 610. At the step 610, the vertical scan speed is accelerated by one stage. At the step 611, the document 10 is scanned and then flow returns.

At the step 614, whether or not the present vertical scan mode is the low speed vertical scan mode is judged, and if it is, the flow shifts to the step 615 and if not, the flow shifts to the step 624 while the mode is judged as the stop mode. At the step 615, whether the number of the buffered code bits is greater than the reference value $M_1$ but is less than the reference value $M_{max}$ is judged and if it is, the flow shifts to the step 616 and if not, the flow shifts to the step 619. At the step 616, whether or not the present vertical scan speed is equal to the constant speed of the low speed vertical scan mode is judged, and if it is, the flow shifts to the step 618. At the step 617, the vertical scan speed is accelerated or decelerated by one stage so that the vertical scan speed comes close to the constant speed.

At the step 618, the document 10 is scanned and the flow returns. At the step 619, whether or not the number of the buffered code bits is less than the reference value $M_1$ is judged and if it is, the flow shifts to the step 620 and if not, the number of the buffered code bits is judged as $M_{max}$ and the flow shifts to the step 622. At the step 620, the vertical scan speed is accelerated by one stage and the document 10 is scanned. At the step 621, the mode is set to the high speed vertical scan mode and the flow returns. At the step 622, the vertical scan speed is decelerated by one stage and the document 10 is scanned. At the step 623, the mode is set to the step mode, followed then by return. At the step 624, whether or not the number of the buffered code bits is less than $M_2$ is judged and if it is, the flow shifts to the step 625 and if not, it shifts to the step 627. At the step 625, the vertical scan speed is accelerated by one stage and the document 10 is scanned. At the step 626, the mode is set to the low speed vertical scan mode, followed then by return. At the step 627, whether or not the vertical scan is in the stop condition is judged, and if it is, the flow returns and if not, the flow shifts to the step 628. At the step 628, the vertical scan speed is decelerated by one stage and the document 10 is scanned, followed then by return.

Next, an example wherein the present invention is applied to a facsimile receiver will be described.

Figure 8:
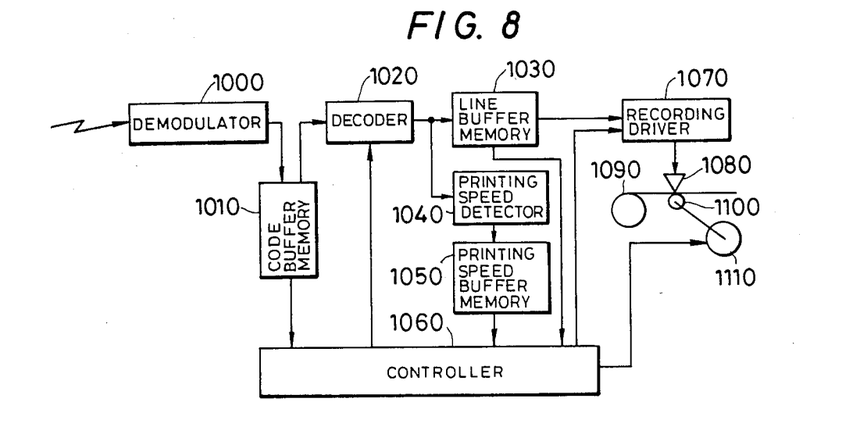
FIG. 8 is a data flowchart when the present invention is applied to a high speed facsimile receiver.

Referring to FIG. 8, reference numeral 1000 represents a demodulator which demodulates a transmission signal sent through a telephone network to a digital signal (which corresponds to the code in the case of a high speed facsimile); 1010 is a code buffer memory for storing the codes; 1020 is a decoder for decoding the codes to the original video signals; 1030 is a line buffer memory for storing the video signals; 1040 is a printing speed detector for calculating a printing speed in the unit of scanning lines corresponding to the number of black pixels in the video signal; 1050 is a printing speed buffer memory for storing the printing speed; 1060 is a controller; 1070 is a recording driver; 1080 is a thermosensitive recording head; 1090 is recording paper; 1100 is a rubber roller; and 1110 is a motor for accomplishing the vertical scan by moving the recording paper in the vertical scan direction.

Next, the operation of the facsimile receiver will be described.

The transmission signal sent from the facsimile transmitter through the telephone network is demodulated to the digital signal by the demodulator 1000. In the case of the high speed facsimile, the digital signal is the MH code, for example. The codes from the demodulator 1000 are once stored in the code buffer memory 1010 and decoded to the original video signal by the decoder 1020. The video signal is stored in the line buffer memory 1030 and is sent to the printing speed detector 1040, too. The printing speed buffer 1050 stores the printing speed. The controller 1060 transfers the video signal stored in the line buffer memory 1030 to the recording driver 1070, applies the power to the recording driver 1070 in accordance with the printing speed stored in the printing speed buffer memory 1050 to drive the thermosensitive recording head 1080, and lets it print the video signals of one scan line in the main scan direction of the recording paper 1090. The controller 1060 receives as its input the number of the buffered code bits in the code buffer memory 1010, the number of the buffered video signals in the line buffer memory 1030 and the printing speed of each scan line in the printing speed detector 1050, switches the vertical scan modes in accordance with the number of the buffered code bits in the manner which will be described in detail with reference to FIG. 10, determines the vertical scan speed from the number of the buffered video signals and from the printing speed in the manner which will be described in detail with reference to FIG. 9, outputs the driving pulse of the frequency corresponding to the vertical scan speed to the motor 1110 and moves the recording paper 1090 in the vertical scan direction.

Figure 9:
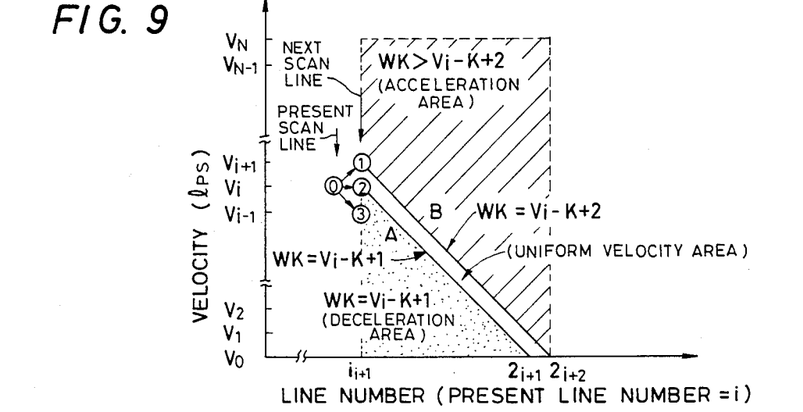
FIG. 9 is a block diagram useful for explaining the principle of determining the vertical scan speed of the facsimile receiver in the present invention.

FIG. 9 shows a vertical scan speed determination method in the high speed mode in a recording system wherein the printing speed is different for each scanning line unit and both the acceleration quantity and deceleration quantity of the vertical scan speed are set in advance. In the diagram, the ordinate represents the speed (lps) and the abscissa represents the scanning line number with the present scanning line number being represented by i. In the range from $V_o$ to $V_N$ of the ordinate, the vertical scan speed is divided so that the speed change quantity (between $V_{n-1}$ and $V_n$; n is a natural number up to N) of one stage is below the acceleration quantity and deceleration quantity that are set in advance (with the proviso that $V_{n-1} < V_n$), and accleration and deceleration only one stage by one are permitted. Incidentally, this embodiment is based on the premise that the practical vertical scan speed in an arbitrary scan line is below the printing speed of the arbitrary scan line.

In FIG. 9, it will be assumed that the vertical scan speeds of the preceding scan lines of and from the (i+2)th line are decelerated one stage by one with $V_i$ representing the actual vertical scan speed of the ith line (⊙ in FIG. 9) and $V_{i+1}$ representing the imaginary vertical scan line of the (i+1)th scan line ( ① in FIG. 9). In this case, or in other words, if a scan line having a printing speed which is lower than an acceleration lower limit curve B representing the vertical scan speed $W_K = V_{i-k+2}$ of the k preceding scan line on the abscissa does not exist, $V_{v+1}$ is accelerated as the practical vertical scan speed of the (i+1)th line.

It will be assumed that the imaginary vertical scan speed of the (i+1)th scan line is $V_i$ ( ② in FIG. 9) and the vertical scan speeds of the preceding scan lines of and from the (i+2)th scan line are decelerated one stage by one in cases other than the case described above. If any scan line having a printing speed lower than the uniform speed lower limit curve A of $V_k = V_{i-k+1}$ as a set of the vertical scan speeds do not exist, $V_i$ is regarded as the practical vertical scan speed of the (i+1)th line (uniform speed), and the vertical scan speed of the (i+2)th is decelerated to $V_{i-1}$ ( ③ in FIG. 9) in the cases other than the acceleration and uniform speed described above.

Incidentally, the printing speed of the scan line that does not exist in the line buffer memory 1030 is regarded as $V_o$ (stop). Such a case occurs when the decoding speed of the decoder 1020 is lower than the vertical scan speed or no code exists in the code buffer memory 1010.

The embodiment described above provides the effect that smooth and high speed vertical scan making the most of the printing speed can be accomplished.

Figure 10:
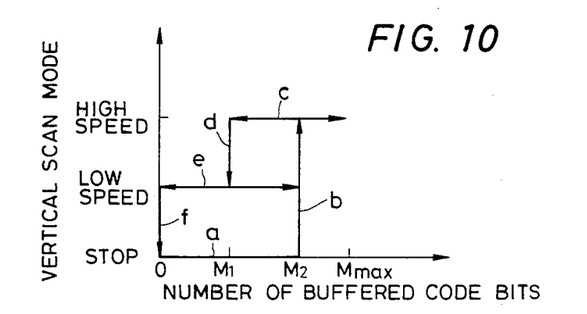
FIG. 10 is a diagram showing the changes of the vertical scan modes in the facsimile receiver in the present invention.

FIG. 10 shows a vertical scan mode transition diagram with the ordinate representing the vertical scan modes and the abscissa representing the number of the buffered code bits. Symbols $M_1$ and $M_2$ ($M_1 < M_2$) of the abscissa represent the reference values. The high speed vertical scan mode of the ordinate is the vertical scan mode described in FIG. 9 which makes the most of the printing speed. The low speed vertical scan mode is the mode using, as its vertical scan speed, 5 lps which corresponds to 200 ms/line as the transmission time near the average transmission time necessary for the transfer of a region having a great information quantity of a standard document, for example.

Next, the flow of the mode shift will be explained.

It will be assumed that the state of the facsimile receiver is at the origin of the diagram of FIG. 10. When the codes are transmitted from the facsimile transmitter, the number of the buffered code bits increases along a state line a. When the number of the buffered code bits is above the reference value $M_2$, the mode shifts from the stop mode to the high speed vertical scan mode along a state line b. Under this state, the number of the buffered code bits increases and descreases along a state line c. As the number of the buffered code bits comes close to the capacity $M_{max}$ of the code buffer memory 1010, temporary stop instruction of transmission is sent to the transmitter in order to prevent the overflow of the code buffer memory 1010. The over flow does not occur if the high speed vertical scan mode is set to a speed higher than the transmission speed. When the number of the buffered code bits is below the reference value $M_1$, the mode shifts to the low speed vertical scan mode along a state line d. Under this state, the number of the buffered code bits increases and decreases along a state line e. If scan lines having transmission speeds lower than the vertical scan speed (e.g. 5 lps) of the low speed vertical scan mode continue, the number of the buffered code bits decreases along the state line e but generally increases along the state line e. When the number of the buffered code bits is above the reference value $M_2$ under this state, the mode shifts again to the high speed vertical scan mode. When the number of the buffered code bits reaches zero, the mode shifts to the stop mode, and the mode shift described above is repeated. At the time of the mode shift, the vertical scan speed is accelerated and decelerated one stage by one.

In accordance with this embodiment, vertical scan is made at a low speed when the number of the buffered code bits becomes small, so that the frequency that the number of the buffered code bits becomes zero can be reduced and hence the occurrence of the stop of recording that occurs when the number of the buffered code bits becomes zero can be reduced. Accordingly, this embodiment provides the effect that the occurrence of non-uniform printing resulting from the stop of vertical scan at intermediate portions of a page can be reduced.

Figure 11A:
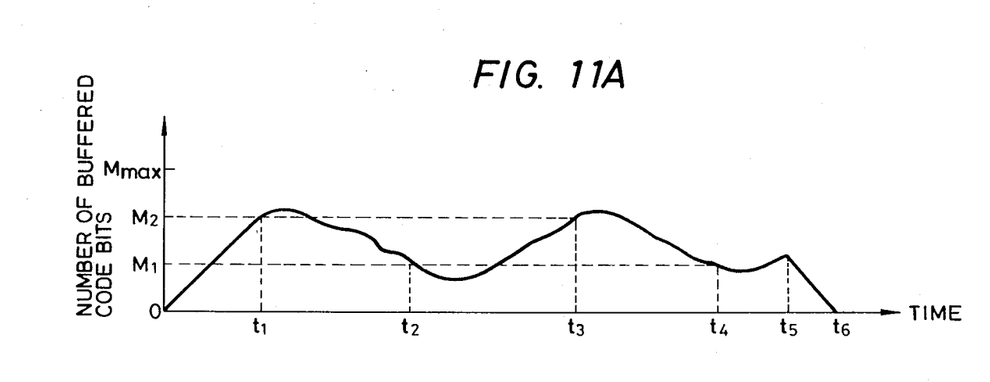
FIGS. 11A & B are operation time charts of the facsimile receiver in the present invention.
Figure 11B:
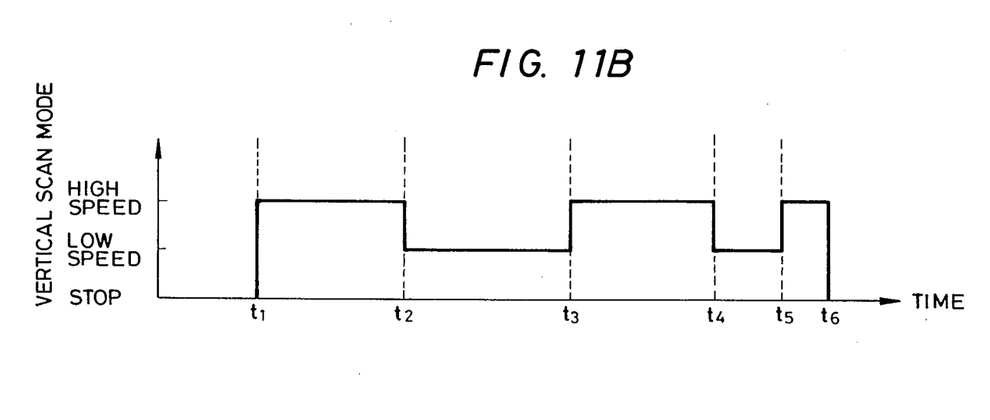

FIG. 11 shows a timing chart when a certain document is received. The abscissa in FIGS. 11A and 11B represent the same time. The ordinate in FIG. 11A represents the number of the buffered code bits and the ordinate in FIG. 11B represents the vertical scan mode. Since vertical scan is stopped and recording is not made till the time $t_1$ from the start of reception, the number of the buffered code bits increases at a constant speed in proportion to the transmission speed. When the number of the buffered code bits reaches $M_2$ at the time $t_1$, recording is started in the high speed vertical scan mode. Since the number of the buffered code bits becomes below $M_1$ at the time $t_2$, the mode shifts to the low speed vertical scan mode. Similarly, the mode shifts to the high speed vertical scan mode at the time $t_3$ and then the low speed vertical mode at the time $t_4$. When the last code of the page is inputted at the time $t_5$, the mode shifts to the high speed vertical scan mode regard to the number of the buffered code bits. Recording is completed at the time $t_6$.

As described above, in this embodiment, when the last code of the page is inputted, the mode shifts to the high speed vertical scan mode without regard to the number of the buffered code bits. Accordingly, the time from completion of code reception till completion of recording (the time from $t_5$ to $t_6$ in FIG. 11) can be reduced and hence, the recording time of one page (the time from $t_1$ to $t_6$ in FIG. 11) can be reduced.

Figure 12:
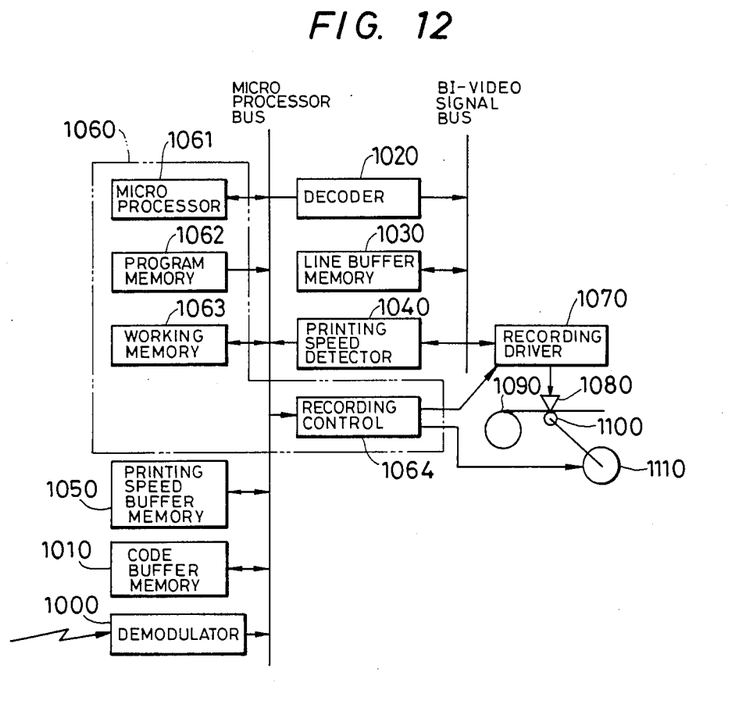
FIG. 12 is a block circuit diagram of the facsimile receiver in the present invention.

FIG. 12 is a block diagram showing the circuit construction of the embodiment of the invention when it is applied to the facsimile receiver. The circuit portions represented by reference numerals 1000 to 1110 in FIG. 12 correspond to those represented by reference numerals 1000 to 1110 in FIG. 8. The controller 1060 consists of constituents 1061 to 1064. Reference numeral 1061 represents the microcomputer; 1062 is a memory which stores the program of the microcomputer and uses generally an ROM; 1063 is a working memory of the microcomputer which generally uses an RAM; and 1064 is a recording control circuit which outputs a current feed pulse to a recording driver 1070 and a driving pulse to a motor 1110.

Next, the operation of the facsimile receiver will be described briefly.

The analog transmission signal transmitted from the transmitter through the telephone network is converted into a digital signal (codes in this case) by the demodulator 1000 and is stored in the code buffer memory 1010. The decoder 1020 receives the code from the code buffer memory 1010 through the microcomputer bus, decodes it to the original video signal and lets the line buffer memory 1030 store the video signal through the bi-level video signal bus. The printing speed detector 1040 receives the video signals of one scan line stored in the line buffer memory 1030 through the bi-level video signal bus, detects the printing speed in the unit of scan line by counting the number of black pixels and lets the printing speed buffer memory 1050 store the printing speed through the microcomputer bus.

Figure 13:
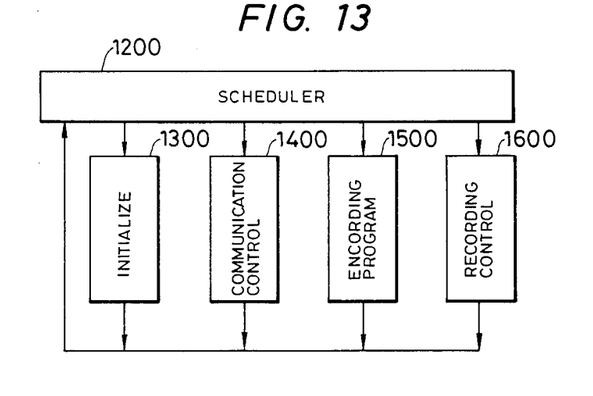
FIG. 13 is a block diagram showing the program construction of the facsimile receiver in the present invention.

The microcomputer 1061 controls each circuit portion in accordance with the task shown in FIG. 13. It transfers the video signals of one scan line inside the line buffer memory 1030 to the recording driver 1070, lets the recording control circuit 1064 feed the power to the recording driver 1070 in accordance with the printing speed in the printing speed buffer memory 1050, receives the number of the buffered code bits in the code buffer memory 1010, the number of the buffered video signals in the line buffer memory 1030 and the printing speed in the printing speed buffer memory 1050, and instructs the recording control circuit 1064 to drive the motor 1110 in accordance with the vertical scan speed determined by the flows shown in FIGS. 14 and 15. Upon receiving the power feed instruction and motor driving instruction from the microcomputer 1061, the recording control circuit 1064 supplies the current to the recording driver 1070 for printing and drives the motor 1110 to accomplish vertical scan.

FIG. 13 shows the program construction of the facsimile receiver, which is executed by the microcomputer 1061. Reference numeral 1200 represents a scheduler, which starts each task. Reference numeral 1300 represents a task which initializes the system, and the stop state of the system, for example, is stored in the working memory 1063. Reference numeral 1400 represents a communication control task, which controls the communication with the facsimile transmitter, receives the codes, for example, lets the line buffer memory 1010 store the codes and detects its overflow. When the possibility of the overflow occurs, the communication control task instructs the facsimile transmitter to stop transmission by flow control. Reference numeral 1500 represents an encoding program task which supplies a decoding instruction to the decoder 1050 when the buffered code exists and the empty region also exists in the line buffer memory 1030. Reference numeral 1600 represents a recording control task which is started by the scheduler 1200 in a predetermined interval at the time of completion of one scan line and at the time of stop of recording. Its detail will be explained with reference to FIG. 14.

Figure 14:
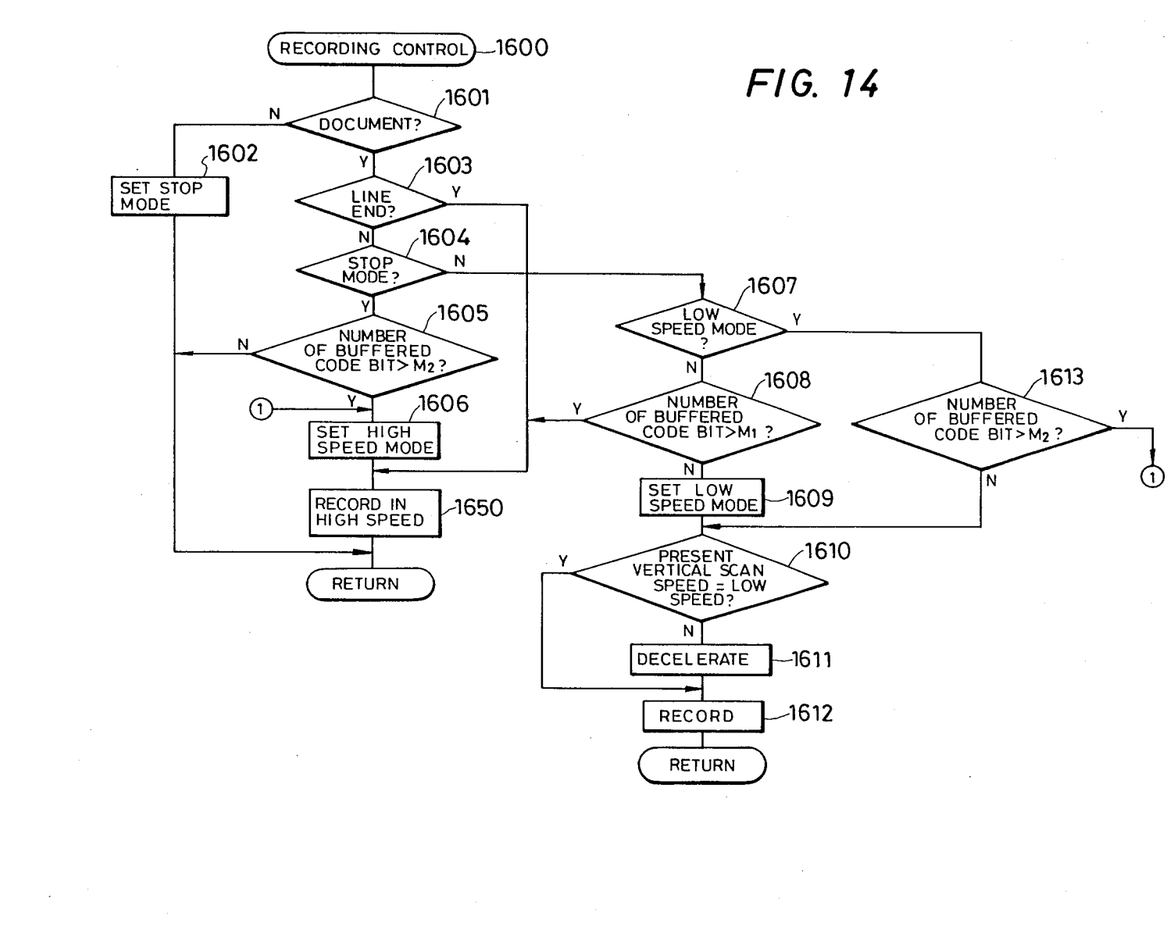
FIG. 14 is a flowchart of a recording control program of the facsimile receiver in the present invention.

FIG. 14 is a flowchart of the recording control task. When actuated by the scheduler 1200, the task judges at the step 1601 whether or not the video signal to be recorded that exceeds the signals of one scan line exist in the line buffer memory 1030, and if not, the flow shifts to the step 1602 and if it does, the flow shifts to the step 1603. At the step 1602, the present state is judged as the stop and the flow returns to the scheduler. At the step 1603, whether or not the last code of the page is inputted to the line buffer memory 1010 is judged, and if it is, the flow shifts to the step 1650 and if not, to the step 1604. At the step 1604, whether or not the present state is the stop mode is judged, and if it is, the flow shifts to the step 1605 and if not, to the step 1607. At the step 1605, whether or not the number of the buffered code bits is greater than the reference value $M_2$ is judged, and if it is, the flow shifts to the step 1606 and if not, returns to the start while keeping the stop mode.

At the step 1606, the present state is changed to the high speed mode, and then the flow shifts to the step 1650. The step 1650 is a program which effects recording in the high speed vertical scan mode, and its detail will be explained with reference to FIG. 15. When recording is effected at the step 1650, the flow returns to the start. At the step 1607, whether or not the present state is the low speed vertical scan mode is judged, and if it is, the flow shifts to the step 1613 and if not, the present state is judged as the high speed vertical scan mode and the flow shifts to the step 1608. At this step 1608, whether or not the number of the buffered code bits is greater than the reference value $M_1$ is judged and if it is, the flow shifts to the step 1650, recording is effected in the high speed vertical scan mode and then the flow returns to the start. If the number of the buffered code bits is smaller than the reference value $M_1$, the flow shifts to the step 1609, at which the present state is changed to the low speed vertical scan mode. At the step 1610, whether or not the vertical scan speed is in agreement with the speed of the low speed vertical scan mode is judged, and if it is, the flow shifts to the step 1612 and if not, to the step 1611.

At the step 1611, the vertical scan speed is set to a speed which is lower by one stage. At the step 1612, the video signals of one scan line are transferred from the line buffer memory 1030 to the recording driver 1070, and recording instruction is given to the recording control circuit 1064. At the same time, power is applied to the recording driver 1070 for printing, the driving pulse of a predetermined frequency is outputted to the motor 1110 and the recording paper 1090 is moved at a predetermined vertical scan speed in order to execute recording. Thereafter the flow returns to the start.

If the present state is the low speed vertical scan mode, whether or not the number of the buffered code bits is greater than the reference value $M_2$ is judged, and if it is, the flow shifts to the step 1606 and the present state is changed to the high speed vertical scan mode to execute the step 1650. If the number of the buffered code bits is smaller than $M_2$, the flow shifts to the step 1610 while keeping the low speed vertical scan mode, and recording is effected in the low speed vertical scan mode.

Figure 15:
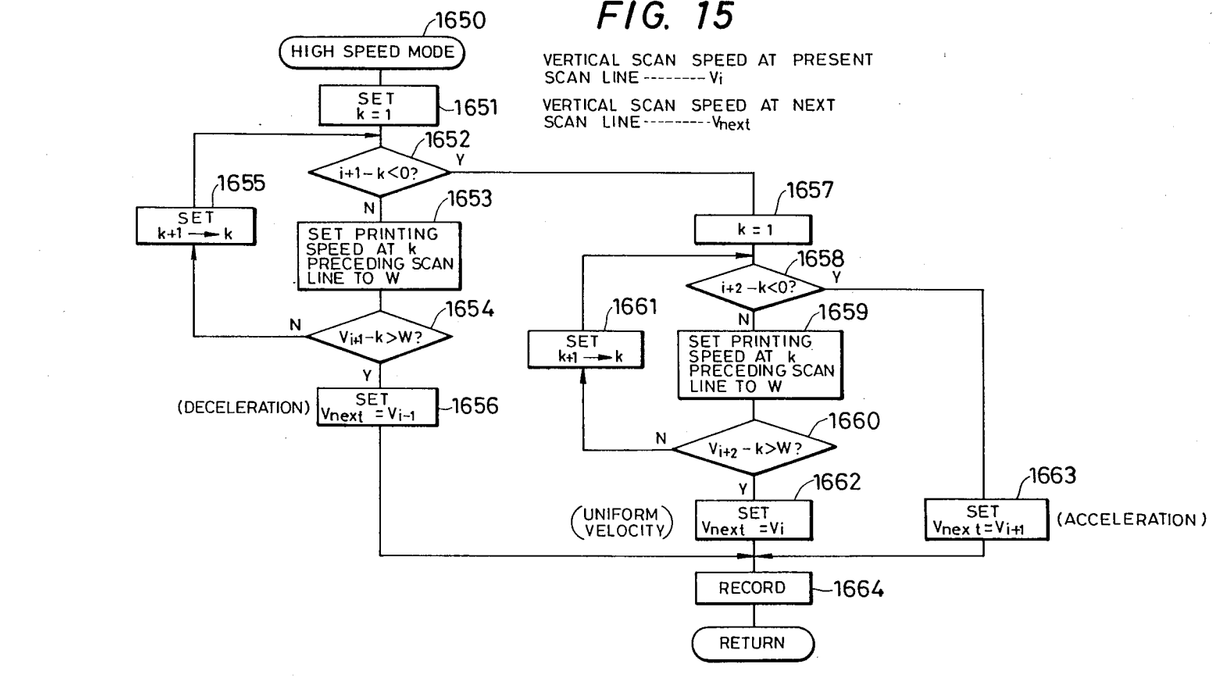
FIG. 15 is a flowchart of a recording control program in the high speed vertical scan mode of the facsimile receiver in the present invention.

FIG. 15 is a flowchart when recording is made in the high speed vertical scan mode. Here, the present vertical scan speed and the next vertical scan speed are called $V_i$ and $V_{next}$, respectively. At the step 1651, a variable k is set to 1. At the step 1652, whether or not the value $i+1-k$ is minus is judged and if it is, the flo shifts to the step 1657 and if not, to the step 1653. At this step 1653, the printing speed of the scan line which is the k preceding line from the present line is inputted to the variable w. If this printing speed does not exist, w is set to zero. Whether or not the vertical scan speed $V_{i+1-k}$ is greater than the printing speed w is judged and if it is, the flow shifts to the step 1656 and if not, to the step 1655, where the variable k is incremented by one and then the flow returns to the step 1652.

The step 1655 is repeatedly executed from the step 1652. At the step 1656, $V_{next}$ is set to $V_{i-1}$ (one stage deceleration) and the flow shifts to the step 1664. The steps from 1657 to 1661 are the flows that judge whether or not the speed is uniform. At the step 1657, the variable is changed to 1 and then the flow shifts to 1658. At this step 1658, whether or not the value $i+2-k$ is minus, and if it is, the flow shifts to the step 1663, where acceleration is judged possible and $V_{next}$ is accelerated by one stage to $V_{i+1}$. If the value $i+2-k$ is not minus, the flow shifts to the step 1659, where the printing speed of the kth preceding line is inputted to w, and at the step 1660, whether or not the speed $V_{i+2-k}$ is higher than the printing speed w of the kth preceding line is judged. If it is higher, the speed is judged as uniform and the flow shifts to the step 1662, where $V_{next}$ is set to $V_i$, and if not, the flow returns to the step 1661, where k is incremented by one and the flow returns to the step 1658. When the next vertical scan speed is determined in the procedures described above, printing is made at the step 1664 and vertical scan is made at the vertical scan speed thus determined, thereby effecting recording. Thereafter, the flow returns to the start.

Figure 16:
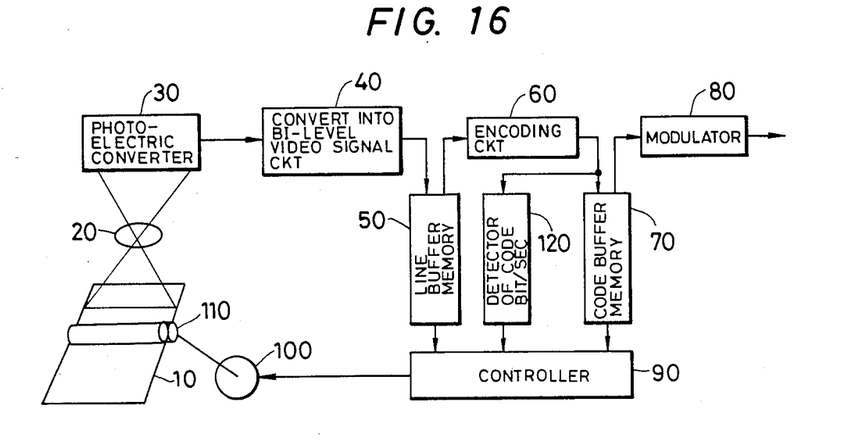
FIG. 16 is a block diagram showing an improved example of the data flow shown in FIG. 1.

FIG. 16 shows an example of improvement of the facsimile transmitter shown in FIG. 1.

Reference numeral 120 in FIG. 16 represents a detector of code bit/sec. Even when the vertical scan speed reaches the level of the predetermined low speed vertical scan mode under the state of the state line d (the low speed vertical scan mode is gradually decreased so that the encoding speed comes close to the transmission speed on the basis of the encoding speeds of the past several lines.

This embodiment can reduce the number of stops of vertical scan.

Figure 17:
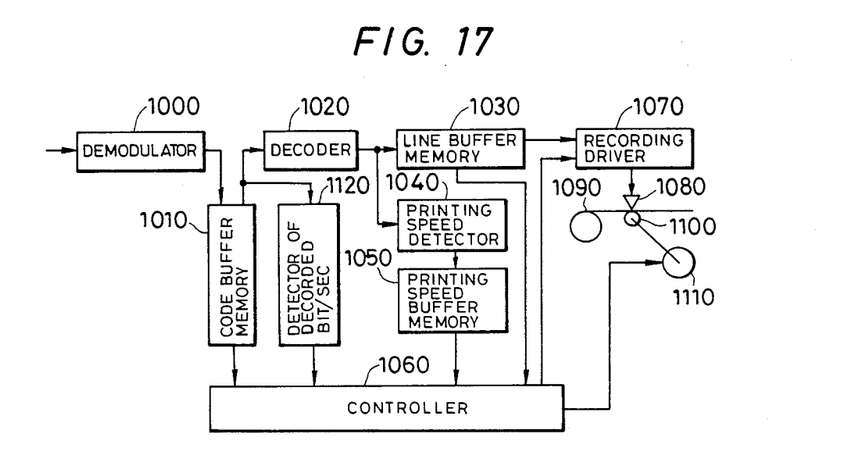
FIG. 17 is a block diagram showing an improved example of the data flow shown in FIG. 8.

FIG. 17 shows an example of improvement of the facsimile receiver shown in FIG. 8.

Reference numeral 1120 in FIG. 17 represents a detector of recording bit/sec. Even when the vertical scan speed reaches the level of the predetermined low speed vertical scan mode under the state of the state line e of FIG. 10 (the low speed vertical scan mode), the vertical scan speed of the low speed vertical scan mode is gradually decreased so that the recorded bit/sec comes close to the transmission speed on the basis of the recording bit/sec of the past several lines.

This embodiment can further reduce the number of stops of the vertical scan.

As described above, the present invention can reduce the number of stops of vertical scan at intermediate portions of a page in the facsimile transmitter and receiver, and provides the effect that reading and recording can be made accurately.

What is claimed is:

1. In a method of controlling vertical scan speed in the relative movement of a document and a recording medium by a predetermined length in a vertical scan direction and effecting reading and recording of said document, the improvement comprising:
    storing information signals in a line buffer memory and storing coded signal bits corresponding to the information signals in a code buffer memory for storing signals which are scheduled to be recorded;
    setting vertical scan speeds in accordance with the number of the buffered code bits of said code buffer memory in at least a first vertical scan mode and a second vertical scan mode which is different from said first scan mode;
    changing the mode from said first vertical scan mode to said second vertical scan mode when the number of the buffered code bits of said code buffer memory reaches a first reference value; and
    changing the mode from said second vertical scan mode to said first vertical scan mode when the number of the buffered code bits of said code buffer memory reaches a second reference value which is different from said first reference value.

2. A control method of a vertical scan speed according to claim 1, wherein transmission to said recording medium is made by scanning said document in a main scan direction to generate video signals in a scan line unit, relatively moving said document and a light receiving portion in the vertical scan direction to read said document and to generate said video signals, subjecting said video signals to redundancy reduction encoding in the scan line unit, storing said redundancy reduction codes in a code buffer memory and then transmitting said codes.

3. A control method of a vertical scan speed according to claim 1 wherein reception for said recording medium is made by storing the received codes in said line buffer memory, decoding said codes and converting them to said video signals, recording said video signals in a scan line unit in the main scan direction, and relatively moving a recording head and recording paper in the vertical scan direction to effect a recording.

4. A control method of a vertical scan speed according to claim 1 wherein said vertical scan speed is gradually changed at the time of shift of said vertical scan modes in such a manner that the acceleration of the vertical scan speed is below a predetermined level.

5. In a method of controlling vertical scan speed in the relative movement of a document and a recording medium by a predetermined length in a vertical scan direction and effecting reading and recording of said document, the improvement comprising:

storing the signals thus read in a line buffer memory for storing signals which are scheduled to be recorded;

setting vertical scan speeds in accordance with the number of the buffered code bits of said line buffer memory in at least a first vertical scan mode and a second vertical scan mode which is different from said first scan mode;

changing the mode from said first vertical scan mode to said second vertical scan mode when the number of the buffered code bits of said line buffer memory reaches a first reference value; and changing the mode from said second vertical scan mode to said first vertical scan mode when the umber of the buffered code bits of said line buffer memory reaches a second reference value which is different from said first reference value, wherein recording to said recording medium is effected in the highest speed vertical scan speed mode irrelevantly to the number of the buffered code bits after the last code of a page is received.

6. In a method of controlling vertical scan speed in the relative movement of a document and a recording medium by a predetermined length in a vertical scan direction and effecting reading and recording of said document, the improvement comprising:

storing the signals thus read in a line buffer memory for storing signals which are scheduled to be recorded;

setting vertical scan speeds in accordance with the number of the buffered code bits of said line buffer memory in at least a first vertical scan mode and a second vertical scan mode which is different from said first scan mode;

changing the mode from said first vertical scan mode to said second vertical scan mode when the number of the buffered code bits of said line buffer memory reaches a first reference value; and changing the mode from said second vertical scan mode to said first vertical scan mode when the number of the buffered code bits of said line buffer memory reaches a second reference value which is different from said first reference value, wherein the application time of a current to said recording head for printing in the scan line unit is different in accordance with the content of said video signals of the scan line to be recorded;

the vertical scan speed is divided in advance into $V_o$ (stop)$<V_{21}< \ldots <V_N$ and is changed stepwise only one stage at a time so that the acceleration and deceleration of the vertical scan speed is below a predetermined level, and is changed only one stage by one; and the vertical scan speed further includes:

a first vertical scan mode wherein when the vertical scan speed of a present scan line and that of a next scan line are assumed to be $V_i$ and $V_{i+1}$, respectively, and when the vertical scan speed after the next scan line and so forth are decelerated one stage by one, the vertical speed is accelerated and the vertical scan speed of the next scan line is set to $V_{i+1}$ if there does not exist any scan line having a printing speed lower than the vertical scan speed and when the vertical scan speed of the next scan line is assumed to be $V_i$ in cases other than the case described above and when the vertical scan speeds after the next scan line are decelerated one stage by one and when there does not exist any scan line having a printing speed lower than the vertical scan speed, the vertical scan speed of the next scan line is set to $V_i$ (uniform speed) and the vertical scan speed of the next scan line is decelerated to $V_{i-1}$ in cases other than the two cases described above; and a second vertical scan mode wherein the vertical scan speed is set below the lowest printing speed.

* * * * *